E. F. ACKERMAN.
APPARATUS FOR COATING STRIPS OF TIN OR THE LIKE WITH RUBBER OR OTHER PLASTIC MATERIAL
APPLICATION FILED OCT. 5, 1914.
1,197,326.  Patented Sept. 5, 1916.
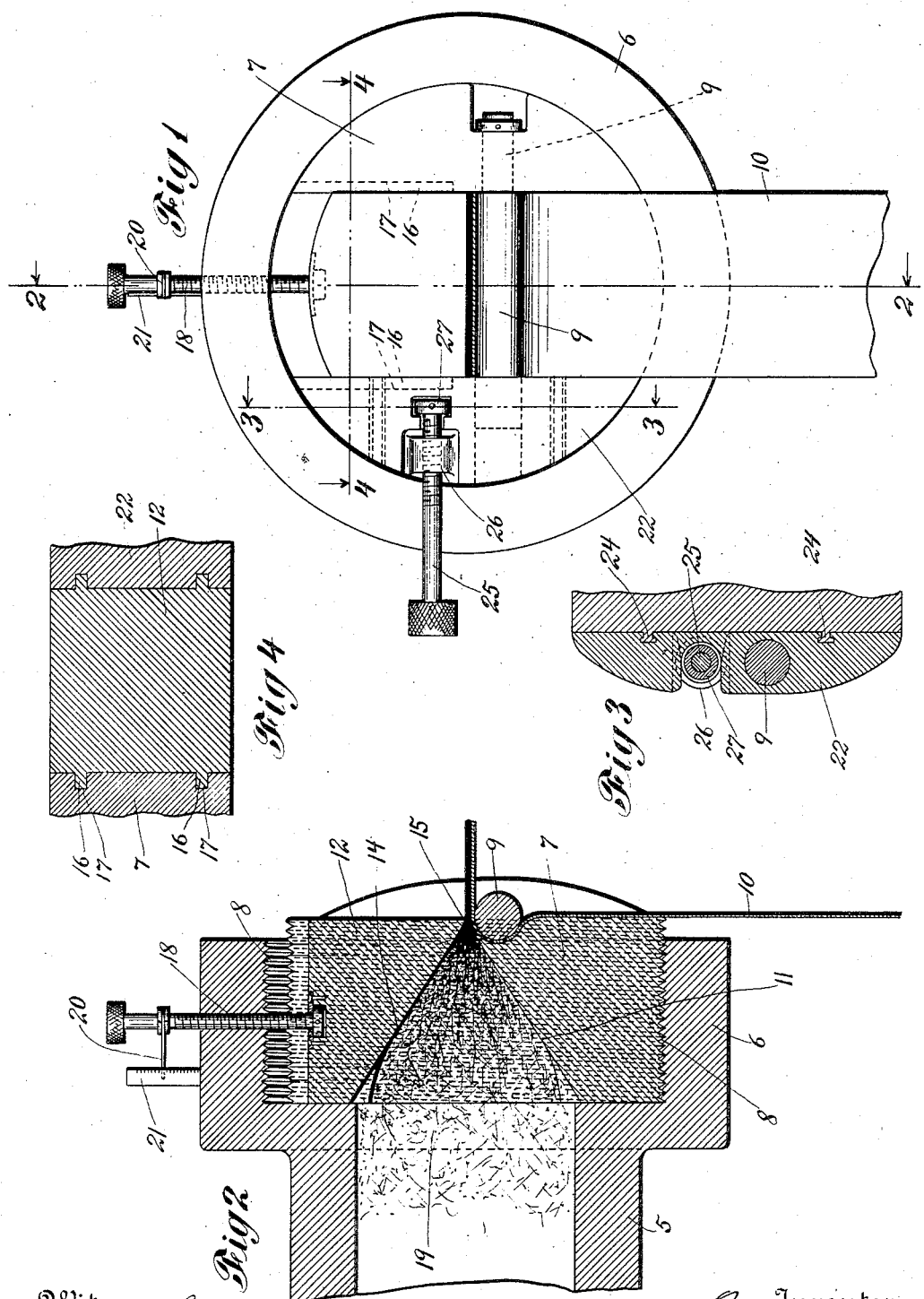

UNITED STATES PATENT OFFICE.

EDWARD F. ACKERMAN, OF PASSAIC, NEW JERSEY, ASSIGNOR TO THE OKONITE COMPANY, OF PASSAIC, NEW JERSEY, A CORPORATION OF NEW JERSEY.

APPARATUS FOR COATING STRIPS OF TIN OR THE LIKE WITH RUBBER OR OTHER PLASTIC MATERIAL.

1,197,326. Specification of Letters Patent. Patented Sept. 5, 1916.

Application filed October 5, 1914. Serial No. 864,999.

*To all whom it may concern:*

Be it known that I, EDWARD F. ACKERMAN, a citizen of the United States, residing at Passaic, in the county of Passaic and State of New Jersey, have invented certain new and useful Improvements in Apparatus for Coating Strips of Tin or the like with Rubber or other Plastic Material, of which the following is a specification.

This invention relates to an apparatus for coating strips of tin or the like with plastic rubber or other material, and one of the objects of the invention is to devise a structure which may be employed with the ordinary device which is at present employed for expressing rubber or other plastic material in tubular form.

In the accompanying drawings, which are to be taken as part of this specification, and in which I have shown a merely preferred form of embodiment of the invention, Figure 1 is a front elevation illustrating an embodiment of my invention; Fig. 2 is a section on the line 2—2 of Fig. 1 looking in the direction of the arrows; Fig. 3 is a section on the line 3—3 of Fig. 1 looking in the direction of the arrows, and Fig. 4 is a detail showing the manner in which the vertical controller member or gate is guided.

Referring to the numerals on the drawings, there is shown at 5 the head of a tube machine or other device from which the rubber or other plastic material is adapted to be expressed. This head has an enlarged end 6, within which is screw-threaded a member 7, the screw threads being indicated at 8. The member 7 carries on its front face a roller 9, suitably journaled, and over this roller 9 the strip of tin 10 or the like is intended to be passed, being drawn forward in any suitable way. The member 7 on its inner face is inclined, as indicated at 11, and there is a vertically adjustable gate or controlling member 12, which has an inner face oppositely inclined to the inclination 11, as indicated at 14. The outer end or point 15 of the controlling member 12 is in the line of a vertical diameter of the roller 9, and the controlling member 12 itself is guided in its vertical movements by means of tongues 16 engaging in corresponding grooves 17 in the member 7. A screw 18 is threaded through the end 6 of the head 5 and bears at its inner end against the controlling member 12, so that as the screw is turned down the controlling member 12 is moved vertically downward. The screw 18 need not be positively connected to the member 12 to move the latter upward, because the pressure of the material 19 against the inner face of the member 12 will tend to move the latter upwardly. The screw 18 may be provided with an indicating finger 20 coöperating with a scale 21 fixed on the head 5, as shown in Fig. 2. It is evident that when the material 19 is pressed forward, that is, to the right in Fig. 2, by any usual means, it will issue through the slit between the roller 9 and the point 15 of the member 12, simultaneously with the strip 10. The thickness of the deposit of the material on the strip will depend upon the vertical position of the member 12, which as stated, is controlled by the screw 18.

It will be evident that if I desire to coat strips of thin width it will be necessary only to provide a series of members 7, with their controlling members 12, in which the width of the slit defined between the roller 9 and the point 15 will vary.

In Fig. 1 I have shown a double adjustment, that is, the vertical adjustment for varying thickness of deposit, and the horizontal adjustment for different widths of strips. In that figure, and in Fig. 3, incidentally, the member 7 carries the vertically adjustable controlling member 12 as before, but it also carries a horizontally adjustable member 22, which slides over the member 7 by means of the tongue and groove connection 24, and also slides over the roller 9. The control of this horizontally adjustable member 22 is accomplished by means of a screw 25, which is threaded in a boss 26 carried on the member 7, and which is secured as at 27 in the member 22. By this construction it is obvious that I am enabled to secure adjustment for varying thicknesses of deposit of the rubber or other material on the strip and also adjustment for various widths of strip.

It will also be obvious that instead of the sliding controlling gate or gates I may use controlling members which are movable in some other way as, for instance, pivoted members. Or, I might use devices in the nature of eccentrics, so that when rotated to one position the openings controlled thereby would be of less extent, and when rotated to another position they would be of greater extent.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense. It is also to be understood that the language used in the following claims is intended to cover all the generic and specific features of the invention herein described and all statements of the scope of the invention which, as a matter of language, might be said to fall therebetween.

I claim:

1. In a device of the kind described, a head through which material is adapted to be expressed, said head having an enlarged end, and a device securable in said enlarged end and including a roller, a member on either side of the roller and a gate relatively movable with respect to the roller arranged between said members, whereby a slit may be defined between the roller and said gate.

2. In a device of the kind described, a head through which material is adapted to be expressed, said head having an enlarged end, and a device securable in said enlarged end and including a roller, a member on either side of the roller one movable, and a gate arranged between said members relatively movable with respect to the roller, whereby a slit may be defined between the roller, the gate and the movable member.

3. In a device of the kind described, a head through which material is adapted to be expressed, said head having an enlarged end, and a device securable in said enlarged end and including a roller, a member on either side of the roller one movable, and a gate arranged between said members relatively movable with respect to the roller, said movable member arranged to slide over the face of said gate, whereby a slit may be defined between the roller, the gate and the movable member.

4. In a device of the kind described, a head through which material is adapted to be expressed, said head having an enlarged end, and a device securable in said enlarged end and including a roller, a member on either side of the roller one movable, and a gate arranged between said members relatively movable with respect to the roller, said movable member arranged to slide over the face of said gate, whereby a slit may be defined between the roller, the gate and the movable member and means for moving the said movable member and the gate.

5. In a device of the kind described, a head through which material is adapted to be expressed, said head having an enlarged end, and a device securable in said enlarged end and including a roller spaced from said end over which a strip of material is adapted to be passed, a member on either side of the roller, and a gate arranged between said members relatively movable with respect to the roller whereby a slit may be defined between said members, the gate and the roller.

6. In a device of the kind described, a head through which material is adapted to be expressed, said head having an enlarged end, and a device securable in said enlarged end and including a stationary member and a movable member, a roller carried by the stationary member and a gate arranged between said members and relatively movable with respect to the roller whereby a slit may be defined between the roller, the gate and said members.

In testimony whereof I affix my signature in presence of two witnesses.

EDWARD F. ACKERMAN.

Witnesses:
  GEO. T. MANSON,
  H. DURAND CLUWN.